(12) United States Patent
Lycan et al.

(10) Patent No.: US 6,289,722 B1
(45) Date of Patent: Sep. 18, 2001

(54) HELIUM LEAK TESTER FOR VEHICLE FUEL TANKS

(75) Inventors: Paul Dale Lycan, Brooklyn; Aaron Thomas Schellenberg, Canton, both of MI (US)

(73) Assignee: Visteon Global Tehnologies, Inc., Dearborn, MI (US)

( * ) Notice: Subject to any disclaimer, the term of this patent is extended or adjusted under 35 U.S.C. 154(b) by 0 days.

(21) Appl. No.: 09/348,241

(22) Filed: Jul. 6, 1999

(51) Int. Cl.$^7$ ........................................... G01M 3/04
(52) U.S. Cl. .................. 73/49.2; 72/49.3; 72/40.7
(58) Field of Search .................... 73/40.7, 49.2, 73/49.5, 864.33, 41, 41.2, 41.3, 41.4, 45, 45.1, 45.2, 45.3, 454

(56) References Cited

U.S. PATENT DOCUMENTS

| | | | |
|---|---|---|---|
| 3,616,680 | 11/1971 | Schrader | 73/40.7 |
| 3,748,905 | * 7/1973 | Fletcher et al. | 73/421.5 R |
| 3,813,923 | 6/1974 | Pendleton | 73/49.2 |
| 3,842,659 | 10/1974 | Bacroix | 73/40.7 |
| 3,949,596 | 4/1976 | Hawk | 73/40.7 |
| 3,956,923 | * 5/1976 | Young et al. | 73/49.3 |
| 4,184,362 | * 1/1980 | Standley et al. | 73/40.7 |
| 4,189,938 | * 2/1980 | Heim | 73/40.7 |
| 4,338,038 | * 7/1982 | Cloarec | 403/56 |
| 4,576,038 | * 3/1986 | Dixon et al. | 73/40.7 |
| 4,577,490 | 3/1986 | Bray et al. | 73/40.7 |
| 4,582,226 | * 4/1986 | Doak | 222/148 |
| 4,601,194 | 7/1986 | Miller et al. | 73/40.7 |
| 4,776,208 | * 10/1988 | Dimeff | 73/40.7 |
| 4,791,805 | 12/1988 | Gates | 73/40.7 |
| 4,862,731 | * 9/1989 | Gates | 73/40.7 |
| 4,924,694 | * 5/1990 | Gates | 73/45.5 |
| 4,949,076 | * 8/1990 | Wann | 340/605 |
| 4,976,136 | * 12/1990 | Willan | 73/40.7 |
| 4,998,435 | 3/1991 | Miller et al. | 73/40.7 |
| 5,048,324 | * 9/1991 | Thompson | 73/40.7 |
| 5,309,752 | 5/1994 | Beckinghausen, Jr. et al. | 73/40.7 |
| 5,375,457 | 12/1994 | Trapp | 73/40.7 |
| 5,412,978 | * 5/1995 | Boone et al. | 73/49.2 |
| 5,509,296 | 4/1996 | Kolb | 73/40.5 R |
| 5,687,606 | * 11/1997 | Reilly | 73/73 |
| 5,798,696 | * 8/1998 | Wong | 340/605 |
| 5,851,110 | * 12/1998 | Ridenour | 431/278 |

FOREIGN PATENT DOCUMENTS 232 567    4/1969 (RU) .

* cited by examiner

Primary Examiner—Daniel S. Larkin
Assistant Examiner—C D Garber
(74) Attorney, Agent, or Firm—John E. Kajander

(57) ABSTRACT

A method of leak testing a walled tank (16) that has multiple joints containing closures or closure devices (18, 20, 22, 24) closing openings in the wall. Rims (38) of multiple cups (26, 28, 30, 32) are disposed against the tank wall to place the cup interiors in substantial sealed covering relation to underlying zones of the tank wall containing joints to be checked. A tank seal (52) is disposed fluid-tight against a fill spud (18) in the tank wall, and a test gas, helium, is introduced into the interior of the tank. Gas from within the interior of each cup is sampled via a respective sampling conduit (48), and a purge gas is introduced into the interior of each cup via a respective purge conduit (46) while the gas from the interior of each cup is being sampled via the respective sampling conduit.

4 Claims, 3 Drawing Sheets

HELIUM LEAK TESTER FOR VEHICLE FUEL TANKS

BACKGROUND OF THE INVENTION

1. Field of the Invention

This invention relates to leak testing that uses a test gas, and more particularly to leak testing of an automotive vehicle fuel tank before it is installed in a vehicle using helium as the test gas.

2. Background Information

One type of equipment that is in use for leak testing mass-produced automotive fuel vehicle tanks before they are installed in a vehicle comprises a test chamber having a hood that opens to allow a fuel tank to be placed within a test chamber space, that then closes during the test, and that finally re-opens after the test to allow the tested fuel tank to be removed. After the hood closes, helium is introduced into the interior of the fuel tank in a manner that achieves sufficient helium concentration and pressure within the tank for the test to proceed. The helium is introduced into the tank through an opening in the tank wall, such as a fill spud, via a conduit that terminates in an end fitting that associates with the tank opening in a sealed manner.

For achieving helium concentration and tank pressure suitable for a test to proceed, the helium is introduced via several pressure/vacuum cycles (three such cycles for instance) that replace a significant portion of the tank air with helium. A pressure of about two psi (pounds per square inch) and a helium concentration of about 40 percent, which are satisfactory values for a test, can be achieved in this manner. While the helium is being introduced, fresh air is circulated through the test chamber space external to the fuel tank for purging any residual helium that may have accumulated under the hood as a result of testing of a previous tank.

Once the purging has concluded and the proper conditions for commencing a test are present within the tank interior, a mass spectrometer that is communicated to the test chamber space begins sampling the background air in that space. Leakage from the tank is evidenced by the mass spectrometer sensing an increase in the helium concentration. The amount by which the mass spectrometer reading increases during a test correlates with a hydrocarbon emission leak rate in terms of mg/day (milligrams HC per day).

The test equipment just described is limited in ability to detect leaks smaller than a certain size. For example, it is believed that the equipment may be incapable of accurately sensing leaks smaller than an equivalent leak that correlates with a hydrocarbon emission leak rate of 100 mg/day. Increasingly stringent regulations may render that test equipment obsolete for determining fuel tank compliance, not necessarily because of a total inability of the equipment to detect the even smaller leaks, but because the ability to do so will require longer test times and more helium. Those factors, or the alternative of adding more test machines of the same kind, add cost to the testing of mass-produced vehicle fuel tanks.

Accordingly, there is a perceived need for test equipment that is capable of measuring even smaller leaks in mass-produced fuel tanks with improved accuracy and cost-effectiveness.

It is believed that limitations in the ability of the existing test to efficiently measure even smaller leaks are due to one or more factors, such as an inherent limit in the sensitivity of the mass spectrometer used in the equipment, the amount of time and helium required to charge a tank that is to be tested, and leakage between the chamber space and its ambient surroundings when the hood is closed.

A more sensitive mass spectrometer is apt to add more cost to the equipment, and therefore measures that can improve the equipment without such added expense would be desirable.

It would also be desirable if the amount of helium uses for a test could be reduced, and if the test duration could be minimized.

Because the test enclosure comprises a hood that seals against a base, any imperfection in sealing between them may become a source of error in test measurement, possibly even giving a false indication of a leak if residual helium in the ambient surroundings were to intrude into the chamber due to faulty sealing of the closed hood to the base. Because a certain minimum helium concentration must be present in the chamber space external to the tank before the mass spectrometer can even give a reading, leakage in the opposite sense, i.e. from the chamber space to the ambient surroundings, may to some extent mask a leak.

Because an entire fuel tank is placed within an enclosed test chamber, specific location of a leak is not likely to be determined using the equipment and method described above. If a defective manufacturing operation that creates a reoccurring leak in fuel tanks is present in a mass-production process, such as at a welding station that welds a component to a tank, the ability to promptly identify the location of that leak may allow early correction of the faulty operation, and obvious savings, when contrasted with tardier correction.

Accordingly, it is also considered desirable for test equipment to possess a capability for disclosing the location of a leak in a tank. It would also be beneficial if fuel tanks could be tested with equipment that does not require placement of an entire tank within a test enclosure as described above.

A preliminary novelty search in connection with this invention developed the following U.S. Pat. Nos. 3,616,680; 3,813,923; 3,842,659; 1,949,596; 4,576,038; 4,577,490; 4,601,194; 4,791,805; 4,862,731; 4,998,435; 5,309,752; 5,375,457; and 5,509,296; and Russian Patent Document No. 232,567.

Certain of those patents are specific to testing automotive fuel vehicle fuel tanks, for example U.S. Pat. Nos. 4,791,805; 4,862,731; and 5,509,296. Certain patents disclose placement of the entire article that is being tested for leakage within an enclosure. Other patents disclose placement of an inverted cup against the exterior of an object in covering relation to an underlying area of the object being tested for leakage. Helium is a commonly used test gas, and mass spectrometers are commonly used for measuring helium concentration.

SUMMARY OF THE INVENTION

Briefly, one general aspect of the invention relates to test equipment for leak testing tanks comprising: multiple cups having rims for placement against a tank wall to place the cup interiors in substantial sealed covering relation to underlying zones of the tank wall containing joints to be checked for leakage; a fitting for fluid-tight association with an opening through the tank wall to introduce a test gas into the interior of the tank; a first conduit from each cup for sampling gas within the cup interior; and a second conduit from each cup for communicating the cup interior to a pneumatic circuit.

Another general aspect relates to a method of leak testing a walled tank that has multiple joints containing closures or closure devices closing openings in the wall, the method comprising: disposing rims of multiple cups against a tank wall to place the cup interiors in substantial sealed covering relation to underlying zones of the tank wall containing joints to be checked for leakage; disposing a tank seal fluid-tight against an opening through the tank wall and introducing a test gas into the interior of the tank; sampling gas from within the interior of each cup via a respective sampling conduit; and introducing a purge gas into the interior of each cup via a respective purge conduit while the gas from the interior of each cup is being sampled via the respective sampling conduit.

A further aspect of the test equipment relates to a cup having a rim for placement against a tank wall to place the cup interior in substantial sealed covering relation to an underlying zone of the tank wall containing a fill spud and a joint between the fill spud and the tank wall that is to be checked for leakage; a fitting assembled to and penetrating the cup and comprising an inner end interior to the cup and an outer end exterior to the cup; the fitting comprising a passageway from the outer end to the inner end for introducing test gas into the interior of the tank when the inner end of the fitting is in fluid-tight association with the fill spud; and a conduit from the cup for sampling gas within the cup interior.

Further aspects will be seen in the ensuing description, claims, and accompanying drawings.

BRIEF DESCRIPTION OF THE DRAWINGS

The drawings that will now be briefly described are incorporated herein to illustrate preferred embodiments of the invention and a best mode presently contemplated for carrying out the invention.

DESCRIPTION OF THE PREFERRED EMBODIMENT(S)

Figure 1:
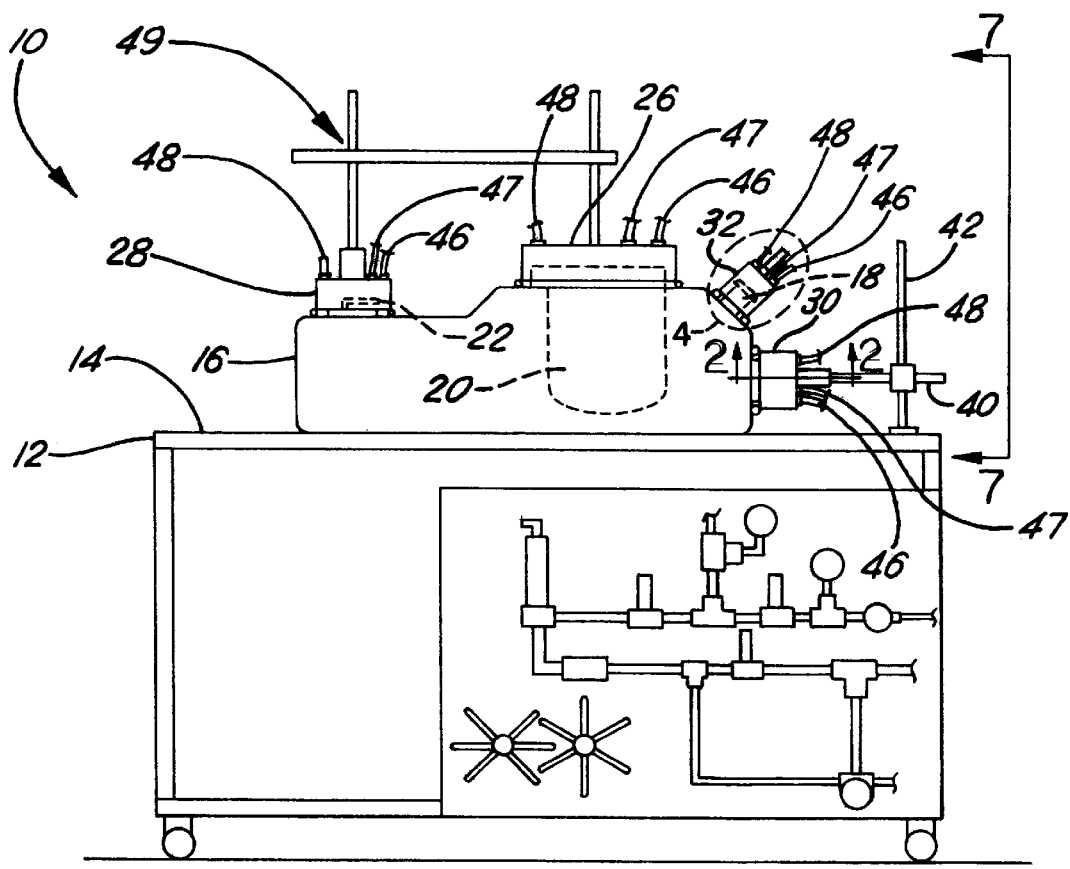
FIG. 1 is a front elevation view of an example of test equipment embodying principles of the present invention, including a fuel tank being tested.

FIG. 1 shows an exemplary embodiment of leak detection test equipment 10 according to principles of the present invention. A stand 12 provides a horizontal top surface 14 on which a fuel tank 16, which is representative of tanks that can be tested in accordance with principles of the present invention, has been placed for testing. Tank 16 is fabricated by using known methods and apparatus to mold suitable material, polymeric material for example, to the desired shape. The tank typically has multiple openings in its wall that serve different purposes. One opening near a corner of a top wall of the tank contains a fill spud 18 through which liquid fuel can enter the tank interior when the tank is in an automotive vehicle and being filled with a supply of fuel for an engine that powers the vehicle. A fuel pump module 20 may be mounted in closure of another opening in the top wall of the tank. Another device 22, such a vent valve for example, may be mounted in closure of still another opening in the top wall. The tank may have other openings that are closed by some form of closure, or closure device, in the top wall or the side wall, and such a closure 24 is shown in the side wall.

Various means for mounting and sealing the closures and closure devices to the openings may be employed. Some may allow for removal of a closure, or closure device* for service, or other appropriate reason; other mountings may be permanent, not allowing closure, or closure device, removal. Fastening mechanisms and seals are one example of the former; plastic welding is an example of the latter. Unlike the other openings that are closed by their closures, or closure devices, fill spud 18 provides an open passageway to the tank interior.

For leak testing fuel tank 16, only those portions of the tank wall where a closure, or closure device, has been disposed at an opening through the tank wall and joined and sealed to the margin of the opening in some manner, need be tested. This is because manufacturing experience has demonstrated that the molding integrity of the fuel tank fabrication process is unlikely to result in any leaks through the tank wall other than possibly locations where a closure or closure device is closing an opening through the wall.

Test equipment 10 further comprises several test cups, each for cooperative association with fuel tank 16 at a respective location where there is a closure or closure device. Hence, FIG. 1 shows three test cups 26, 28, and 30 associated respectively with an area of the tank wall where a closure, or closure device, is mounted in closure of an opening through the wall. Another cup 32 is associated with fill spud 18, but it differs in certain respects from the other cups 26, 28, and 30 because of the fill spud passageway. One difference between cup 32 and the others is that it associates with fill spud 18 during a leak test to convey helium into the tank interior through the fill spud passageway. But all cups 26, 28, 30, and 32 cover respective zones of the tank wall for collecting helium that may be leaking through the respective joint.

Figures 2, 3:
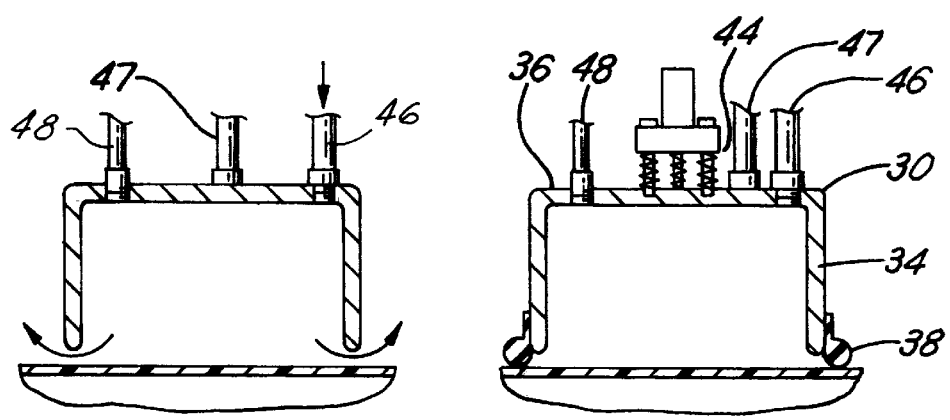
FIG. 2 is an enlarged cross section view in the direction of arrows 2—2 in FIG. 1.
FIG. 3 is a view similar to FIG. 2 showing a modified form.

FIG. 2 shows cup 30 to comprise an imperforate side wall 34 that is closed at one end by a transverse end wall 36 that is imperforate, except for connection of two conduits that will be explained shortly. The opposite end of side wall 34 constitutes the cup rim around the full circumferential extent of which a sealing gasket 38 is disposed. Although the cup side wall is cylindrical, it need not necessarily be circular, nor need the cup rim necessarily lie in a plane that is perpendicular to a central axis of the cup. The important consideration in the design of any particular cup is for the rim to have a contour closely matching that of the margin of the underlying zone of the tank wall covered by the cup. Gasket 38 is a semi-soft gasket type material which is attached to the cup rim in sealed fashion throughout the full circumference of the rim. A thickened portion of the gasket protrudes from the rim, to be disposed against the tank surface to provide substantial sealing of the cup rim to the margin of the underlying zone of the tank wall covered by the cup. Gasket 38 thereby adapts the cup rim to normal slight dimensional variations in the tank wall from tank to tank as tanks are successively tested.

FIG. 1 also shows cup 30 disposed at the distal end of a horizontal rod 40 that is supported via its proximal end on a vertical post 42 that stands upright on stand 12 to disposed rod 40 vertically above top surface 14. During a test, the rim of cup 30 is held sealed against the tank side wall, with the cup disposed over both closure 24 and the opening in the tank wall closed by closure 24. To provide a tolerance range for alignment of the cup to the tank wall, the end wall of the cup is attached to the end of rod 40 through a spring-loaded joint 44 shown in FIG. 2. The example allows the cup to float slightly in a pivotal fashion about the distal end of rod 40 for adapting to a side wall of a tank that may not be exactly true when the tank is fixtured on stand 12 for testing.

Fluid communication between a pneumatic circuit of test equipment 10 and the interior of cup 30 is established by three conduits 46, 47, and 48. An end of each conduit 46, 47, and 48 is attached in fluid-tight fashion to end wall 36 as shown. A purge function is performed on the cup interior through conduit 46; an exhaust function is performed through conduit 47; and a sampling function is performed through conduit 48.

FIG. 1 shows that each of the other cups 26, 28, and 30 also has three conduits 46, 47, and 48. It also shows that those cups are supported in test position by an appropriate framework, 49 generally, of rods and uprights that can be moved out of the way after testing to allow a tested tank to be removed from stand 12 and a new tank placed on the stand.

Figure 4:
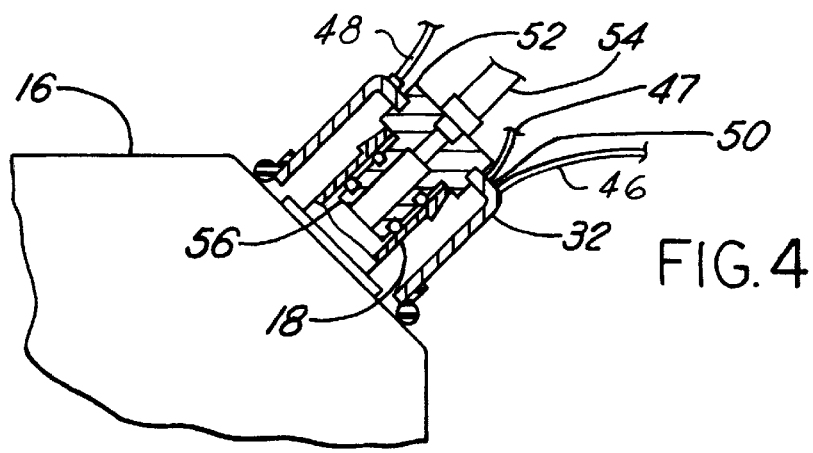
FIG. 4 is an enlarged view in circle 4 of FIG. 1 showing a portion in cross section.

In some tanks, fill spud 18 may be a separate part that is assembled to the tank at an opening in the tank wall, rather than being integrally formed with the tank wall during the process of molding the tank. In such tanks, a leak test must therefore also check the joint between the fill spud and the margin of the tank wall opening with which the fill spud joins. FIG. 4 shows details of cup 32, including the three conduits 46, 47, and 48, that provide that capability, along with the capability of introducing a test gas, i.e. helium, into the tank interior through the fill spud. End wall 50 of cup 32 comprises a hole at its center to which a tank seal 52 is snugly fit so as to be fluid-tight to the hole. A conduit 54 passes centrally through the tank seal 52 for conveying helium from a helium supply through a rubber grommet 56 on the opposite end of the fast test that fits within the entrance of fill spud 18.

As the inner end of the tank seal seals against the outer end of the fill spud, the rim of the cup seals against the tank wall in surrounding relation to the joint where the fill spud joins to the margin of the hole in the tank wall.

Figure 5:
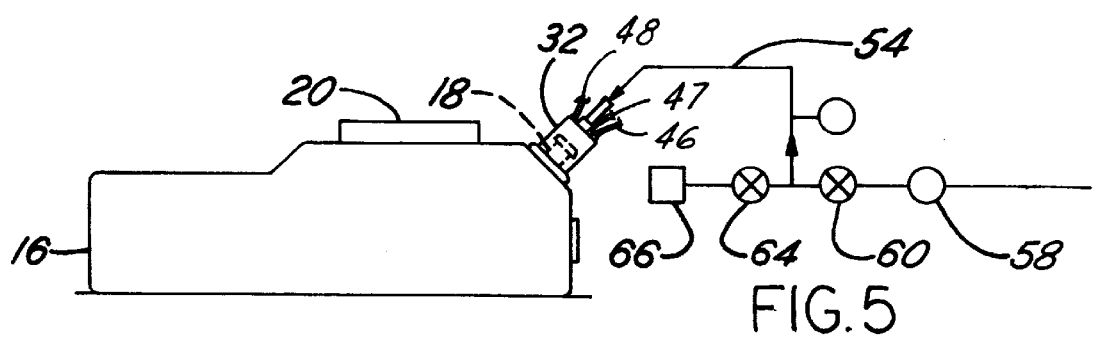
FIG. 5 is a view showing schematically a portion of a pneumatic circuit in association with the fuel tank of FIG. 1.

FIG. 5 shows a portion of the pneumatic circuit of the test equipment that leads to conduit 54. Helium is introduced into the tank to attain a test pressure that is regulated by a pressure regulator valve 58. Opening and closing of valve 58 to conduit 54 is performed through a shut-off valve 60. A pressure gauge, or sensor, 62 is teed into conduit 54. Also teed into conduit 54 is another shut-off valve 64 that is used to open and close conduit 56 to a vacuum pump 66.

Figure 6:
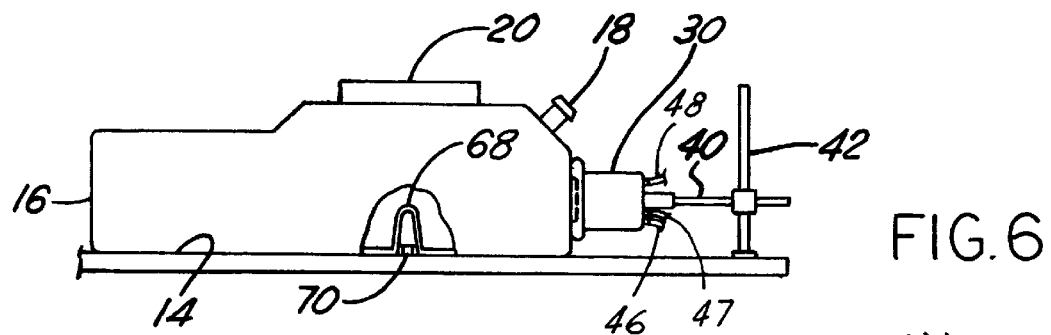
FIG. 6 is a view similar to FIG. 5, but with a portion broken away to show an optional feature that is useful in testing certain fuel tanks.

Certain fuel tanks have a plug that closes a blow-pin hole created during the process of molding the tank. Closure 24 represents such a plug, and as mentioned above, it is checked for leakage by cup 30. Because closure 24, unlike the closure devices located in the tank top wall, is located in the tank side wall, it may be difficult to fixture the tank on stand 12 in a way that assures a sufficient sealing of cup 30 to the tank side wall. FIG. 6 shows an arrangement for avoiding that difficulty. The bottom wall of a tank may have a molded-in indentation 68, a swirl-pot reservoir for instance. An upward pointing cone-shaped wedge 70 on stand 12 can fit into indentation 68 on the exterior of the tank to act against the indentation in the manner of a cam that forces the tank horizontally toward the rim of cup 30.

Figure 7:
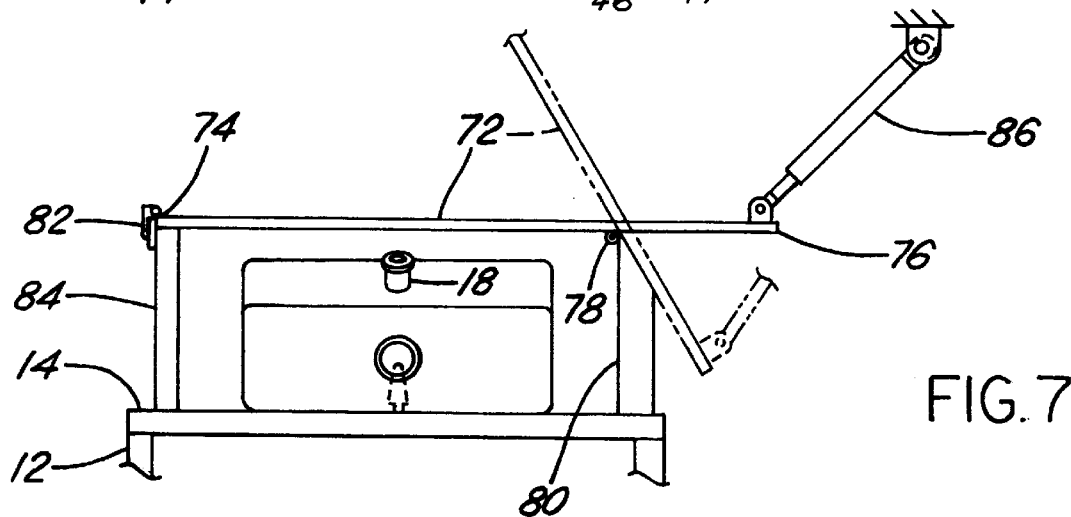
FIG. 7 is a transverse cross section view in the direction of arrows 7—7 in FIG. 1, but shows an alternate embodiment.

For associating cups 26 and 28 with a tank after the tank has been fixtured in place on top surface for a test, those cups may be mounted on the inside of a hinged door 72, as shown in FIG. 7, rather than using a framework 49, as in FIG. 1. Door 72 has a front edge 74 and a back edge 76. A hinge 78 near back edge 76 hinges door 72 on a vertical rear wall 80 for swinging open and closed in the manner suggested by FIG. 7. A latch 82 can latch front edge 74 to the top of an upright front wall 84 when door 72 is placed horizontal to associate cups 26 and 28 with the tank top wall for performing a test in the manner already described. Door 72 can be significantly less massive than the hood of the previous test equipment described near the beginning. It can be opened and closed without the automated moving parts that were required for the previous equipment, and therefore possibly avoid the expense of placing a device, such as a light curtain, around the moving parts. One or more simple gas springs 86 can be associated with the door in the manner shown to hold the door open, while allowing it to be swung without large effort.

Figure 8:
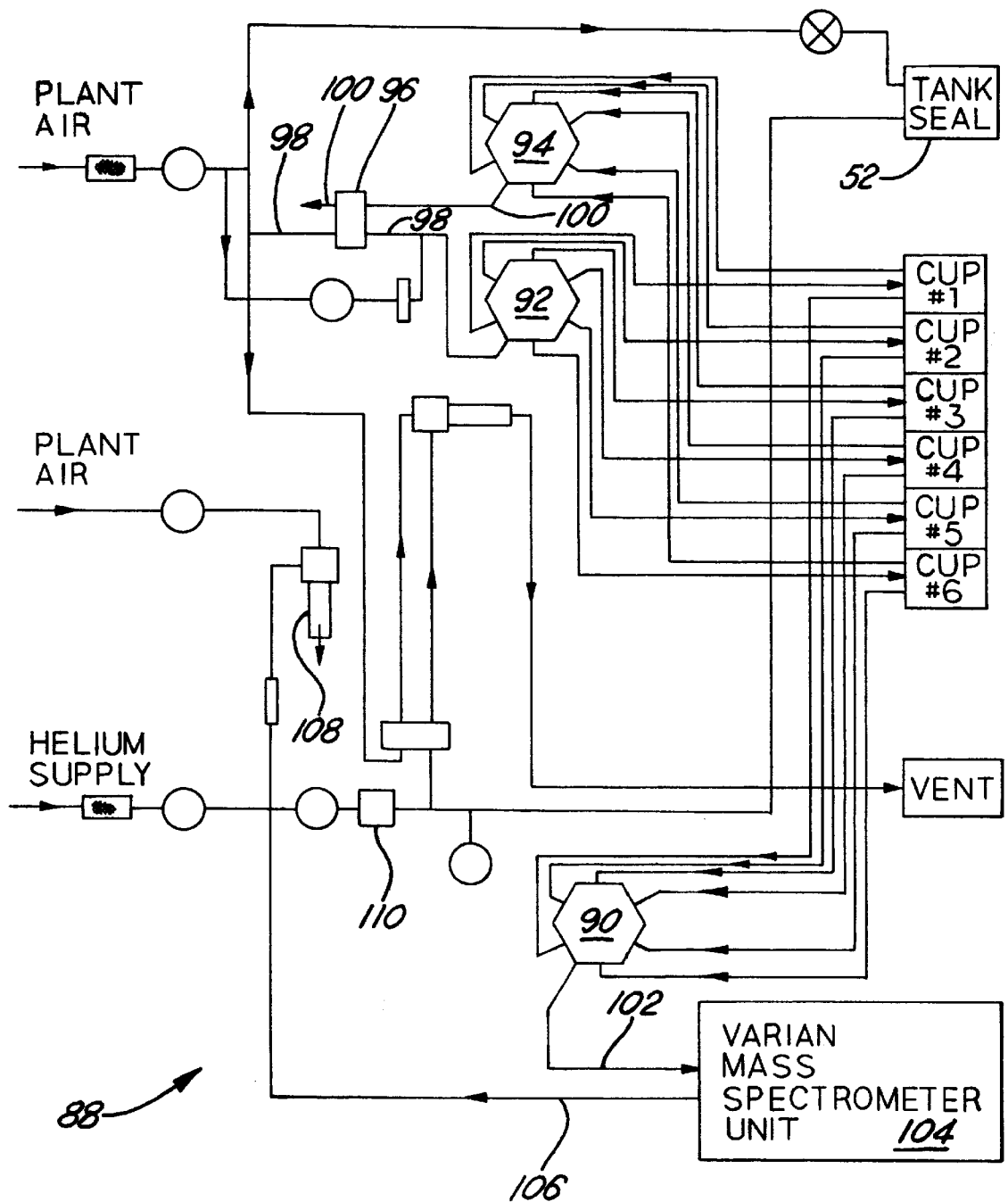
FIG. 8 is a schematic diagram showing a pneumatic circuit of the test equipment.

FIG. 8 shows a pneumatic circuit 88 of test equipment 10. Circuit 88 controls delivery of plant air and helium to the various cups in the manners described earlier. FIG. 8 happens to show two additional collection cups that are like cups 26, 28, and 30. Although cup 32 is shown apart from tank seal 52 in FIG. 8, it is to be appreciated that they collectively form a unit as shown in FIG. 4. Each test cup has to a respective conduit 46, a respective conduit 47, and a respective conduit 48. Each conduit 48 communicates the respective cup interior to a sampling manifold 90. Each conduit 47 communicates the respective cup interior to an exhaust manifold 94. Each conduit 46 communicates the respective cup interior to a purge manifold 92. If any cup is not used for a test, its conduits 46, 47, and 48 are closed in any suitable manner, such as by shut-off valves at the manifolds.

Each manifold 90, 92, 94 advantageously has a polygonal shape with a number of sides corresponding to the number of cups. In the illustrated embodiment, each manifold comprises a regular hexagon. Filtered and pressure-regulated plant air is supplied to purge manifold 92 through a solenoid operated valve 96 when the valve is operated to open a passage through a supply line 98 leading to manifold 92. When valve 96 is operated to open an exhaust line 100 from exhaust manifold 94, the interiors of the cups are vented. While venting may be useful in exhausting residual gas from the cup interiors, it is believed that it is not necessarily essential to the practice of the invention, and it may therefore be considered an optional feature.

Sampling-manifold 90 is communicated via a conduit 102 to an inlet of a mass spectrometer 104 whose outlet is communicated through a conduit 106 to a vacuum pump 108.

Filtered and pressure-regulated helium is supplied through a tank fill valve 110 to fast test 52.

At the beginning of a test, the interior of each cup is purged by plant air. The air passes through purge manifold 92 which distributes the air substantially uniformly to each cup without venturi effect. The sealing of each cup to the tank wall is not completely fluid-tight so that the purge flow can pass out of the cup between the rim and the tank wall. Plant air can be used because of the small volumes of the cups, whereas in the equipment previously used, two blowers were required to purge the chamber space under the hood.

As the cups are being purged, helium is being introduced into the tank. Upon completion of cup purging and attainment of proper helium concentration and pressure in the tank, vacuum pump 108 operates to begin drawing gases from the interiors of the cups through mass spectrometer 104. A small amount of air continues to be introduced into the cups to maintain a slightly positive pressure within the, cups relative to the ambient pressure surrounding them, with excess air exiting through the slightly less than perfectly fluid-tight seal of each cup rim to the tank wall. Any leakage from the tank interior into a cup will cause helium to pass through mass spectrometer 104, which measures the concentration to indicate the extent of leakage. By providing a shut-off valve in each conduit 48, a tank that shows leakage can be further tested to ascertain the leakage location or locations. Each cup can be isolated from the others by leaving the corresponding shut-off valve open while all others are closed.

The equipment and method of the present invention offer a number of unique and important advantages over the prior equipment. Instead of having a large volume chamber space surrounding an entire tank, the total volumes of the individual cups are much smaller. It allows test time to be shorter because a given size leak will increase helium concentration to a detectable level in a small volume much more quickly than in a larger one. Time that would be lost to evacuate residual helium from under the cover of the prior equipment is also avoided with the present invention. Test equipment embodying the present invention is believed less complex than the prior equipment, and hence offers the potential of lower capital cost for new equipment.

If any joint that is being tested contains a closure device that provides an opening to the tank, a normally open vent valve for example, that opening is closed before the test begins.

While a presently preferred embodiment has been illustrated and described, it is to be appreciated that the invention may be practiced in various forms within the scope of the following claims.

What is claimed is:

1. Test equipment for leak testing tanks comprising:

multiple cups having rims for placement against a tank wall to place the cup interiors in substantial sealed covering relation to underlying zones of the tank wall containing joints to be checked for leakage;

a fitting for fluid-tight association with an opening through the tank wall to introduce a test gas into the interior of the tank;

a first conduit from each cup for sampling gas within the cup interior; and a second conduit from each cup for communicating the cup interior to a pneumatic circuit, in which one of the cups and the fitting form a unit for association with a fill spud that is joined to the tank, the cup of the one cup serving to leak test the joint between the fill spud and the tank, and the fitting extending through the cup for fitting fluid-tight to the spud for introducing test gas into the tank through the fill spud.

2. Test equipment or leak testing tanks comprising:

multiple cups having rims for placement against a tank wall to place the cup interiors in substantial sealed covering relation to underlying a ones of the tank wall containing joints to be checked for leakage;

a fitting for fluid-tight association with an opening through the tank wall to introduce a test gas into the interior of the tank;

a first conduit from each cup for sampling gas within the cup interior; and a second conduit from each cup for communicating the cup interior to a pneumatic circuit, including a horizontal support surface on which a tank is fixtured for testing, and in which a first cup associates with a side wall of the tank and a second cup with a top wall of a tank, and an upright member on the horizontal support surface is disposed for association with an indentation in a bottom wall of a tank for forcing the side wall against the first cup.

3. Test equipment for leak testing tanks comprising:

a cup having a rim for placement against a tank wall to place the cup interior in substantial sealed covering relation to an underlying zone of the tank wall containing a fill spud and a joint between the fill spud and the tank wall that is to be checked for leakage;

a fitting assembled to and penetrating the cup and comprising an inner end interior to the cup and an outer end exterior to the cup;

the fitting comprising a passageway from the outer end to the inner end for introducing test gas into the interior of the tank when the inner end of the fitting is in fluid-tight association with the fill spud; and a conduit from the cup for sampling gas within the cup interior.

4. Test equipment as set forth in claim 3 including a further conduit from the cup for communicating the cup interior to a pneumatic circuit.

* * * * *